United States Patent
Kaplan et al.

(10) Patent No.: US 9,514,347 B2
(45) Date of Patent: *Dec. 6, 2016

(54) SECURE CODE GENERATION FOR CUSTOMER TRACKING

(71) Applicant: Fish Six RC, San Francisco, CA (US)

(72) Inventors: Jonathan Kaplan, San Francisco, CA (US); Jay Amando Domingo Llacuna, San Francisco, CA (US); Stanley Peter Demarta, Pleasanton, CA (US)

(73) Assignee: FISH SIX RC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,999

(22) Filed: Nov. 16, 2015

(65) Prior Publication Data

US 2016/0148029 A1   May 26, 2016

Related U.S. Application Data

(63) Continuation of application No. 14/277,361, filed on May 14, 2014, now Pat. No. 9,189,659.

(60) Provisional application No. 61/913,186, filed on Dec. 6, 2013.

(51) Int. Cl.
*G06K 5/00* (2006.01)
*G06K 7/14* (2006.01)
*G06Q 50/26* (2012.01)
*G06Q 30/02* (2012.01)

(52) U.S. Cl.
CPC ............. *G06K 7/1417* (2013.01); *G06K 5/00* (2013.01); *G06Q 30/0234* (2013.01); *G06Q 30/0238* (2013.01); *G06Q 50/265* (2013.01)

(58) Field of Classification Search
CPC ............................ G06K 5/00; G06Q 50/265
USPC .................................................. 235/379, 380
See application file for complete search history.

(56) References Cited

U.S. PATENT DOCUMENTS 9,189,659 B2 * 11/2015 Kaplan .................... G06K 5/00

\* cited by examiner

*Primary Examiner* — Seung Lee
(74) *Attorney, Agent, or Firm* — Artegis Law Group, LLP

(57) ABSTRACT

An authentication server receives a request for a user-identification code from a computing device. The authentication server generates the user-identification code. The authentication server also generates an expiration date associated with the user-identification code. The authentication server transmits the user-identification code and the expiration date to the computing device. The authentication server also validates the user-identification code received from a code scanning system.

12 Claims, 5 Drawing Sheets

SECURE CODE GENERATION FOR CUSTOMER TRACKING

CROSS-REFERENCE TO RELATED APPLICATIONS

This application is a continuation of the co-pending U.S. patent application titled, "SECURE CODE GENERATION FOR CUSTOMER TRACKING," filed on May 14, 2014 and having Ser. No. 14/277,361, which claims the benefit of U.S. provisional patent application Ser. No. 61/913,186, filed Dec. 6, 2013 and titled "SECURE CODE GENERATION FOR CUSTOMER TRACKING." The subject matter of these related applications is hereby incorporated herein by reference.

BACKGROUND OF THE INVENTION

Field of the Invention

Embodiments of the present invention relate generally to user authentication and, more specifically, to secure code generation for customer tracking.

Description of the Related Art

Businesses oftentimes want to provide benefits to customers for a variety of reasons. For example, businesses may provide loyalty rewards to incentivize customers to become or remain repeat customers. Business may also provide rewards to "very important persons" such as celebrities, who may provide businesses with valuable publicity. Businesses may also provide customers with benefits in the form of refillable (or non-refillable) prepayment mechanisms (e.g., gift cards).

Typically, the benefits are provided to customers in the form of a piece of paper or cardboard, or a plastic card on which an encoded mark such as a bar code or quick response code (QR code) is printed. Customers may scan these encoded marks at hardware present in a store in order to obtain benefits. Printed encoded marks are also displayable on a smart phone, which provides customers the freedom from carrying individual pieces of paper or cards.

One drawback with these forms of encoded marks is that they are susceptible to forgery or improper duplicate use. More specifically, while a customer is displaying an encoded mark at a store, an imposter may photograph or otherwise copy that encoded mark. Customers may also voluntarily permit copying the encoded mark by friends or family, which would allow duplicate use of that mark.

As the foregoing illustrates, what is needed in the art are more effective techniques to allow customers to obtain customer benefits while making forgery more difficult.

SUMMARY OF THE PRESENT INVENTION

One embodiment of the present invention sets for an authentication server for managing user-specific benefits. The authentication server receives a request for a user-identification code from a computing device. The authentication randomly generates the user-identification code. The authentication server also generates an expiration date associated with the user-identification code. The authentication server transmits the user-identification code and the expiration date to the computing device. The authentication server also validates the user-identification code received from a code scanning system.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Among other things, embodiments of the present invention are directed towards a system for processing quick response (QR) codes presented by customers at a store, and for refreshing those codes to prevent impersonation. In particular, a server generates and transmits a token (a unique user-identification code) to a customer who can then use the token to generate a QR code. The QR code may be used to be identify the customer at a store. Based on the QR code, the store may decide to provide various products, bonuses, or other benefits to the customer. Embodiments of the present invention are also directed towards the concept of refreshing the QR code when specific events occur. The QR code is refreshed to prevent individuals from impersonating customers by creating a facsimile of a valid QR code. Embodiments of the present invention are further directed towards the concept of tracking QR code uses among different stores to prevent fraudulent presentation of a QR code and to track information about customers with valid QR codes.

Figure 1:
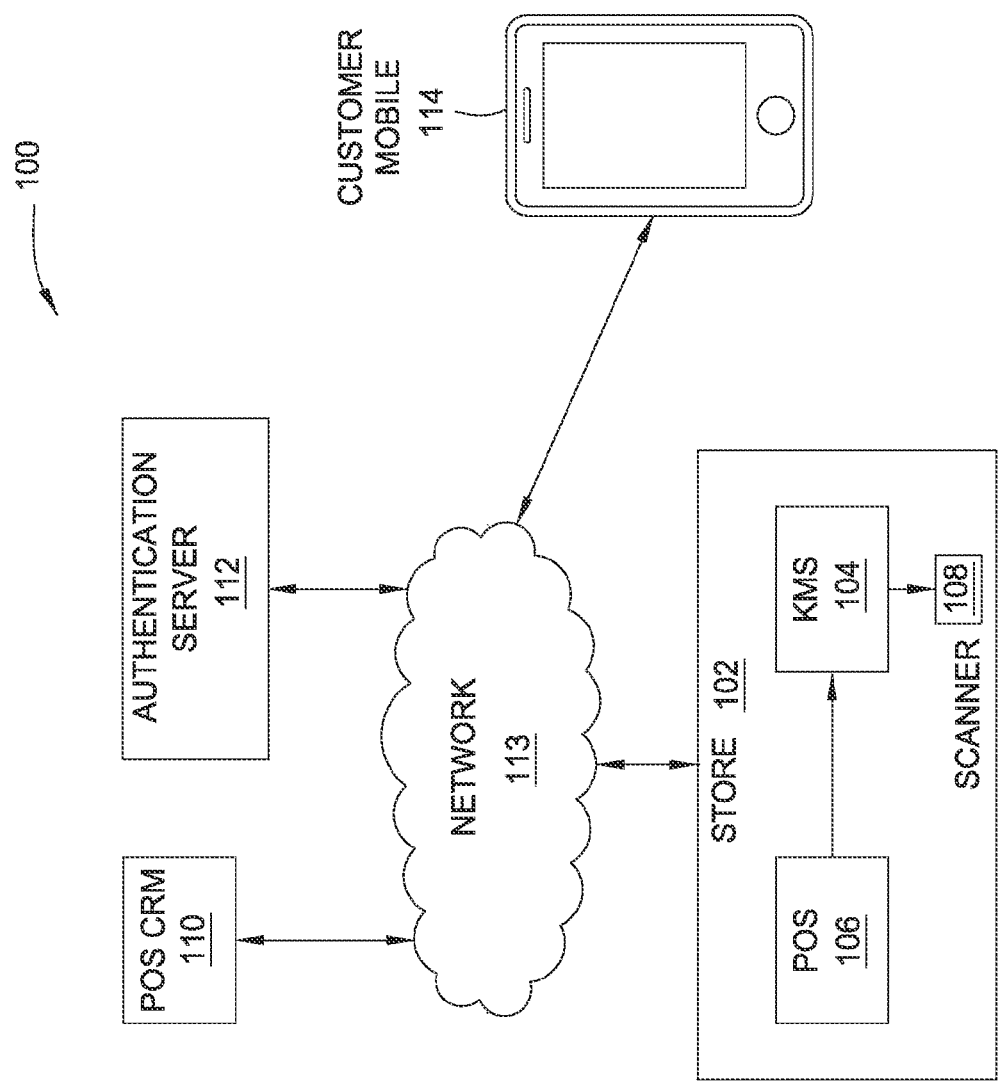
FIG. 1 is a block diagram of a system configured to implement one or more aspects of the invention.

FIG. 1 is a block diagram of a system 100 configured to implement one or more aspects of the present invention. As shown, the system 100 includes a store 102, which includes a kitchen management system (KMS) 104, a point-of-sale system (POS) 106, and a scanner 108. The system also includes a point-of-sale customer-rewards-management system (POS CRM) 110, and an authentication server 112, which are both connected, through a computer network 116 such as the Internet, to the store 102. A mobile computing device 114 is coupled to the authentication server 112 and to the store 102 through the computer network 116. In some embodiments, the computer network 116 may be a global computer network such as the Internet, as is generally known. The store 102 may be any sort of store, such as a brick-and-mortar retail store, a virtual online store, a brick-and-mortar restaurant, or a mobile restaurant, such as, e.g., a food truck. As a general matter, store 102 may be any store, physical or virtual, that is configured to fulfill orders. With a virtual store, customers may be identified by network address (such as internet protocol (IP) address).

KMS 104 is configured to receive QR codes from customer mobile device 114 via scanner 108 (thus KMS 104 may be referred to herein as a "code scanning system"). The QR codes are a secure mechanism by which the customer associated with the customer mobile device 114 is able to securely obtain customer benefits such as free food, discounts, and the like. KMS 104 is also configured to communicate with authentication server 112 for validating the QR codes. KMS 104 is also configured to communicate with POS 106 to inform POS 106 of information related to customer benefits to be afforded to a customer. Persons skilled in the art will recognize that any portion of KMS 104 may be implemented by a remote or cloud-based computing device.

POS 106 is configured to provide an interface to allow store 102 staff to process orders received from a customer. For example, POS 106 may include computer monitors that allow the crew to track order process, touch screen devices that allow the crew to input or modify order information, and databases that dynamically update inventory in response to received orders. POS 106 is also configured to allow store 102 staff to select customer benefits to provide to customer, once authentication server 112 has validated a QR code associated with the customer.

In some embodiments, POS 106 is also configured to provide "secondary" identity verification of a customer for whom authentication server 112 has validated a QR code. POS 106 may provide the secondary verification by verifying the media access control address (MAC address) of the customer mobile device 114, by verifying the identity of the customer via facial recognition cameras, or through human identity verification, where the store staff personally verifies the identity of the customer by, for example, recognizing characteristics specific to the customer, such as the customer's physical appearance. In some embodiments, POS 106 may obtain (from, e.g., POS CRM 110) "alternative" secondary identification profiles for a customer that allow customers to obtain customer benefits even if the customer does not pass the secondary identity verification. More specifically, POS 106 would obtain identification information (such as MAC addresses, facial recognition information, and the like) of alternative persons who are associated with a particular customer (such as family members, personal assistants, and the like), and would verify that the person at the store is one of these alternative persons. If POS 106 verifies an alternative person, instead of the actual customer, then system 100 may provide a lesser degree of customer benefits (for example, 50 dollars worth of benefits, instead of 100 dollars) than if the actual customer were present. In an alternative embodiment, POS 106 would obtain an indication that a particular customer does not need to pass a secondary verification in order to receive customer benefits.

POS CRM 110 is a cloud-based entity that is connected to the store 102 via the computer network 116. POS CRM 110 stores information about customer benefits. When a QR code has been validated for a particular customer, KMS 104 may communicate with POS CRM 110 to obtain and manage customer benefits for that customer.

Customer mobile device 114 is configured to display a website, a mobile application ("app"), a stored picture, or another customer-facing user interface that displays the QR code for identification at the store 102. Customer mobile device 114 may also display a customer-facing user interface that also allows a customer to create an online account, supply billing information, update profile details, configure preferences, review customer benefits, and so forth.

Authentication server 112 is a cloud-based web service or other remotely accessible system configured to communicate with customer mobile device 114 and KMS 104 for validating QR codes and for storing and providing customer information to KMS 104 related to validating QR codes. Thus, authentication server 112 may receive, store, and process data received from store 102 and customer mobile device 114.

In operation, customer mobile device 114, KMS 104, and authentication server 112 work together to generate and validate a Quick Response (QR) code for a particular customer so that the store 102 can securely provide the customer with customer benefits. A customer, through customer mobile device 114 or another platform, communicates with authentication server 112 to create a user account. The user account stores identification information for the customer, such as name, address, phone number, and the like. The customer or an administrator may also set up a customer account in the POS CRM that associates identification information for the customer with customer benefit data such as whether the customer is entitled to credits, promotions, free goods, or discounts.

In order for a customer to receive customer benefits from store 102, the customer, via customer mobile device 114, requests a user-identification code from the authentication server 112, via the computer network 116. In response, the authentication server 112 generates a user-identification code and an expiration date, and provides that user-identification code and expiration date to the customer mobile device 114. The authentication server 112 also stores the user-identification code and expiration date in a database, along with identification information for the user of the customer mobile device 114. In some embodiments, the user-identification code may be a randomly generated string. In other embodiments, the user-identification code may be generated via a lookup table or may be algorithmically generated (e.g., an encryption algorithm). The customer mobile device 114 displays generates a QR code based on the user-identification code in a manner that is generally known to those of skill in the art.

The expiration date is a timestamp that includes a date and time. In alternatively embodiments, the expiration date may include only a time. The expiration date exists to prevent forgery, such as could be accomplished by creating a facsimile of the QR code through, for example, photographing the QR code. To obtain a newly-valid QR code after a QR code has expired, customer mobile device 114 is configured to request a newly generated user-identification code from authentication server 112. Because such codes expire after a relatively short period of time (e.g., 15 minutes), facsimiles of previous QR codes quickly become invalid, thus preventing an imposter from using such facsimiles to improperly obtain customer benefits.

Customer mobile device 114 requests a new user-identification code from authentication server 112 when a new-code event occurs. New-code events include the following events: when a certain pre-determined time has elapsed since retrieving the previous user-identification code, when a customer indicates to the customer mobile device 114 that the customer mobile device 114 should retrieve a new user-identification code, when the app executing on the customer mobile device 114 that normally requests the user-identification code goes to sleep and then awakens, and when the customer mobile device 114 navigates away from the page that typically displays the user-identification code and then navigates back to that page. When the customer mobile device 114 requests a new user-identification code, authentication server 112 generates a new user-identification code and a new expiration date for that user-identification code and transmits the user-identification code and expiration date to the customer mobile device 114 for storage and for presentation to the store 102.

When a customer enters the store 102, customer scans the QR code that is displayed on the customer mobile device 114, at the scanner 108. KMS 104 reads the QR code and transmits the corresponding user-identification code to the authentication server 112 for validation. More specifically, KMS 104 requests an authentication for KMS 104 itself from authentication server 112 and receives a session identification token in response. The purpose of the session identification token is to identify store 102 to the identification server 112. After receiving the session identification token, KMS 104 transmits the user-identification code corresponding to the scanned QR code to the authentication server 112 for validation.

In response to receiving the user-identification code, authentication server 112, performs a lookup operation to determine whether the user-identification code is stored in the database maintained by the authentication server 112. This database includes a list of currently valid user-identification codes, expiration dates for those user-identification codes, and customer identification information corresponding to those user-identification codes. To perform the lookup operation, the authentication server 112 determines whether the user-identification code is stored in an entry in the database, and whether the current time is prior to the expiration date of that user-identification code. If the user-identification code is valid and the expiration date has not yet passed, then the authentication server 112 creates and stores a lease for the customer associated with the user-identification code. The lease has an expiration date and therefore expires after a certain period of time. If the user-identification code is not valid, or the expiration date has passed, the authentication server 112 does not validate the user-identification code.

The authentication server 112 acts as a centralized repository that stores leases for each customer checked-in to any store 102. In some embodiments, a customer is only allowed to be checked into one store. If a customer is already checked in (has a valid, non-expired lease) at a first store 102 and a check-in attempt occurs for the same customer at a second store 102, then the second check-in attempt will overwrite the first check-in (assuming that the second check-in attempt is with a valid user-identification code). More specifically, authentication server 112 will create a new lease for that customer at the other store 102 and will remove the old lease for the first store 102. In embodiments where store 102 is a virtual store, authentication server 112 only permits a single internet protocol (IP) address to be checked-in. In other words, authentication server 112 maintains at most a single lease for a particular customer account, so that only one IP address associated with that customer account can be checked-in at a particular time.

When the customer arrives at a purchase counter, which may be located at a physical distance from the scanner 108, but within the same store 102, store staff checks POS 106 to determine whether the customer is to be afforded any customer benefits. The POS 106 queries the KMS 104 to determine whether the customer is to be afforded any benefits. In response, the KMS 104 queries the authentication server 112 to obtain a list of all customers that have a valid, current (non-expired) lease for the store 102 and provides that list to the POS 106.

When POS 106 receives that list, POS 106 displays the list to store staff, who selects a name from the list that corresponds to the customer. To determine which benefits that customer is afforded, once the store staff has selected the name, the POS 106 communicates with POS CRM 110 to obtain a list of benefits that are to be afforded to the customer.

Figure 2:
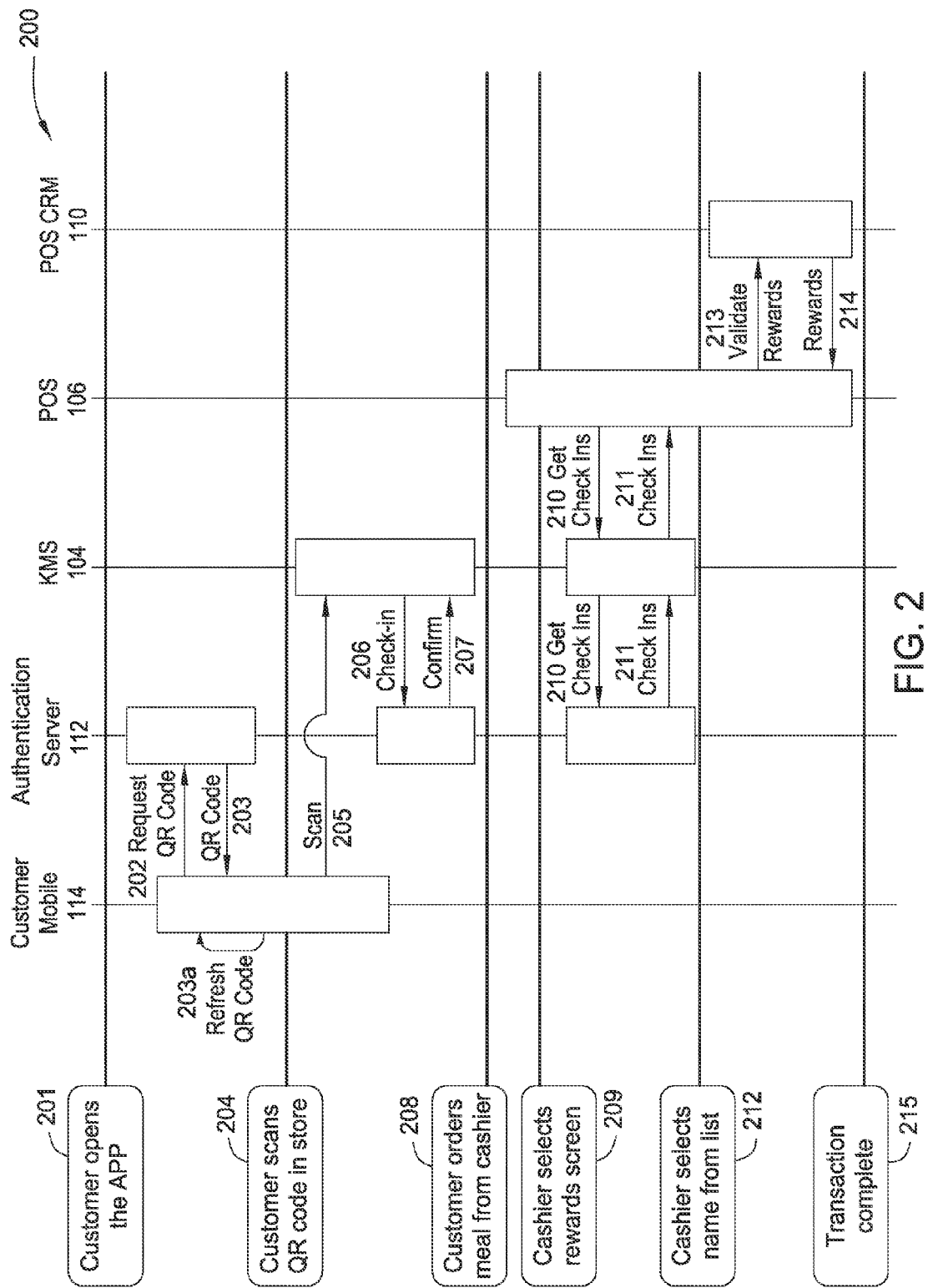
FIG. 2 is a data flow diagram illustrating data that is exchanged when the system of FIG. 1 is in operation, according to one embodiment of the present invention.

FIG. 2 is a data flow diagram 200 illustrating data that is exchanged when the system of FIG. 1 is in operation, according to one embodiment of the present invention. As shown, data flow diagram 200 illustrates data flow between customer mobile 114, authentication server 112, kitchen management system (KMS) 104, point-of-sale system (POS) 106, and point-of-sale customer-rewards-management system (POS CRM) 110. Also, as shown, the data that flows between these elements is a result of actions performed by a customer or an employee of store 102.

In action 201, a customer opens the app on customer mobile device 114. The customer may also activate a QR code refresh button, the app may go to sleep and then reawaken, the customer mobile device 114 may navigate away from and then back to the page that displays the QR code, or an expiration date for a prior QR code may expire. In response to action 201, in action 202, customer mobile device 114 requests a new user-identification code from the authentication server 112. In response, in action 203, authentication server 112 generates and provides a new user-identification code and updates the database with the new user-identification code. In action 203a, when customer mobile device 104 receives the new user-identification code, customer mobile device 114 updates the user-identification code stored in customer mobile device 104 with the new user-identification code.

In action 204, the customer arrives in store 102 and scans the QR code displayed on customer mobile device 114 at scanner 108. In action 205, KMS 104 obtains the QR code from the customer mobile device 114. In action 206, KMS 104 transmits the corresponding user-identification code to the authentication server 112 for validation. In response, in action 207, the authentication server 112 confirms validation of the user-identification code, updates the database of user-identification codes, and creates and stores a lease associating the user-identification code with the customer.

In action 208, the customer arrives at an order placement area and orders a meal from a cashier. In action 209, the cashier opens the rewards screen on POS 106. When the cashier opens the rewards screen, in action 210, POS 106 requests a list of customers that are checked in at store 102 from the authentication server 112, through KMS 104. In response, in action 211, the authentication server 112 provides the list of customers checked in at store 102 to POS 106 through KMS 104.

In action 212, the cashier selects a name from the list of customers displayed on POS 106 that matches the customer who arrives at the order placement area. In action 213, the POS 106 requests from POS CRM 110 the rewards to be afforded to the customer and in response, in action 214, the POS CRM 110 communicates which rewards are to be afforded to the customer. After the cashier and customer process the transaction in accordance with these rewards, in action 215, the transaction is complete.

KMS 104, POS 106, POS CRM 110, authentication server 112, and customer mobile device 114 may each be implemented by a computing device or network of computing devices. An exemplary computing device is described below in conjunction with FIG. 3.

Figure 3:
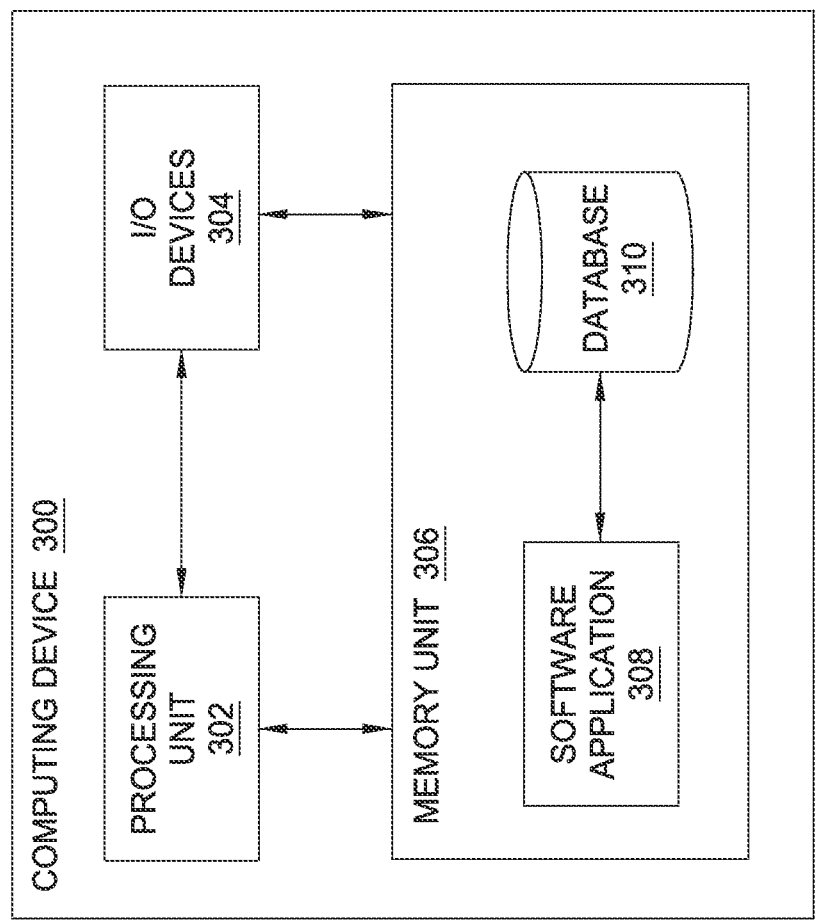
FIG. 3 is an exemplary computing device that resides within the system of FIG. 1, according to one embodiment of the present invention.

FIG. 3 is an exemplary computing device 300 that resides within system 100 of FIG. 1, according to one embodiment of the present invention. Computing device 300 may be a physical or a virtual computing device, or a combination of the two. As shown, computing device 300 includes a processing unit 302, input/output devices 304, and a memory unit 306, coupled to one another. Memory unit 306 includes an application 308 that is coupled to a database 310. Processing unit 302 may be a central processing unit (CPU), application specific integrated circuit, (ASIC), or any other data processing element. I/O devices 304 may include devices capable of receiving input, devices capable of generating output, and devices capable of both receiving input and generating output. Memory unit 306 may include any type of memory module or a collection of memory modules capable of storing data. Software application 308, upon execution by processing unit 302, performs the overall functionality of computing device 302. In doing so, software application 308 may store and/or retrieve data from database 310.

Figure 4:
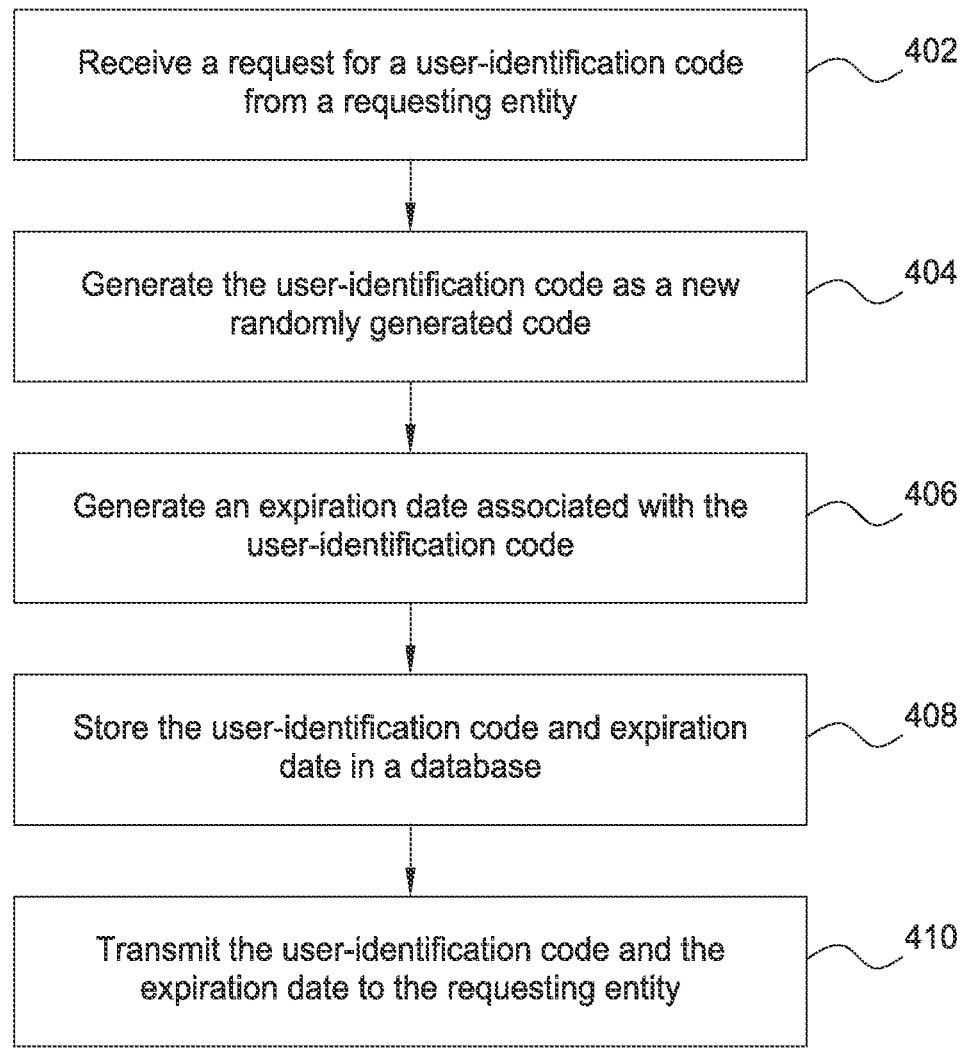
FIG. 4 is a flow diagram of method steps for generating a randomized user-identification code, according to one embodiment of the present invention.

FIG. 4 is a flow diagram of method steps for generating a randomized user-identification code, according to one embodiment of the present invention. Although the method steps are described in conjunction with the systems of FIGS. 1-3, persons skilled in the art will understand that any system configured to perform the method steps, in any order, falls within the scope of the present invention.

As shown, a method 400 begins at step 402, in which the authentication server 112 receives a request for a new user-identification code from a requesting entity such as customer mobile device 114. As described above, the customer mobile device 114 may generate such a request when a user selects a graphical user interface element (such as a button) that is configured to request a new user-identification code, when a user browses away from and then back to a page that displays a user-identification code, when the app that displays the user-identification code goes to sleep and then reawakens, and when the app that displays the user-identification code determines that an expiration date has passed. In step 404, the authentication server 112 generates the user-identification code as a new randomly generated code.

In step 406, the authentication server generates an expiration date associated with the user-identification code. The expiration date is generally a short time in the future, such as 15 minutes, 30 minutes, or the like, to prevent a forgery of the user-identification code from being used by an imposter. In step 408, the authentication server 112 stores the user-identification code and expiration date. The authentication server 112 associates the user-identification code with the expiration date so that after the expiration date passes, the user-identification code is considered invalid. The authentication server 112 also associates user-identification information with the user-identification code so that the customer corresponding to the user-identification code can be identified. In step 410, the authentication server 112 transmits the user-identification code and the expiration date to the requesting entity (customer mobile device 114).

Figure 5:
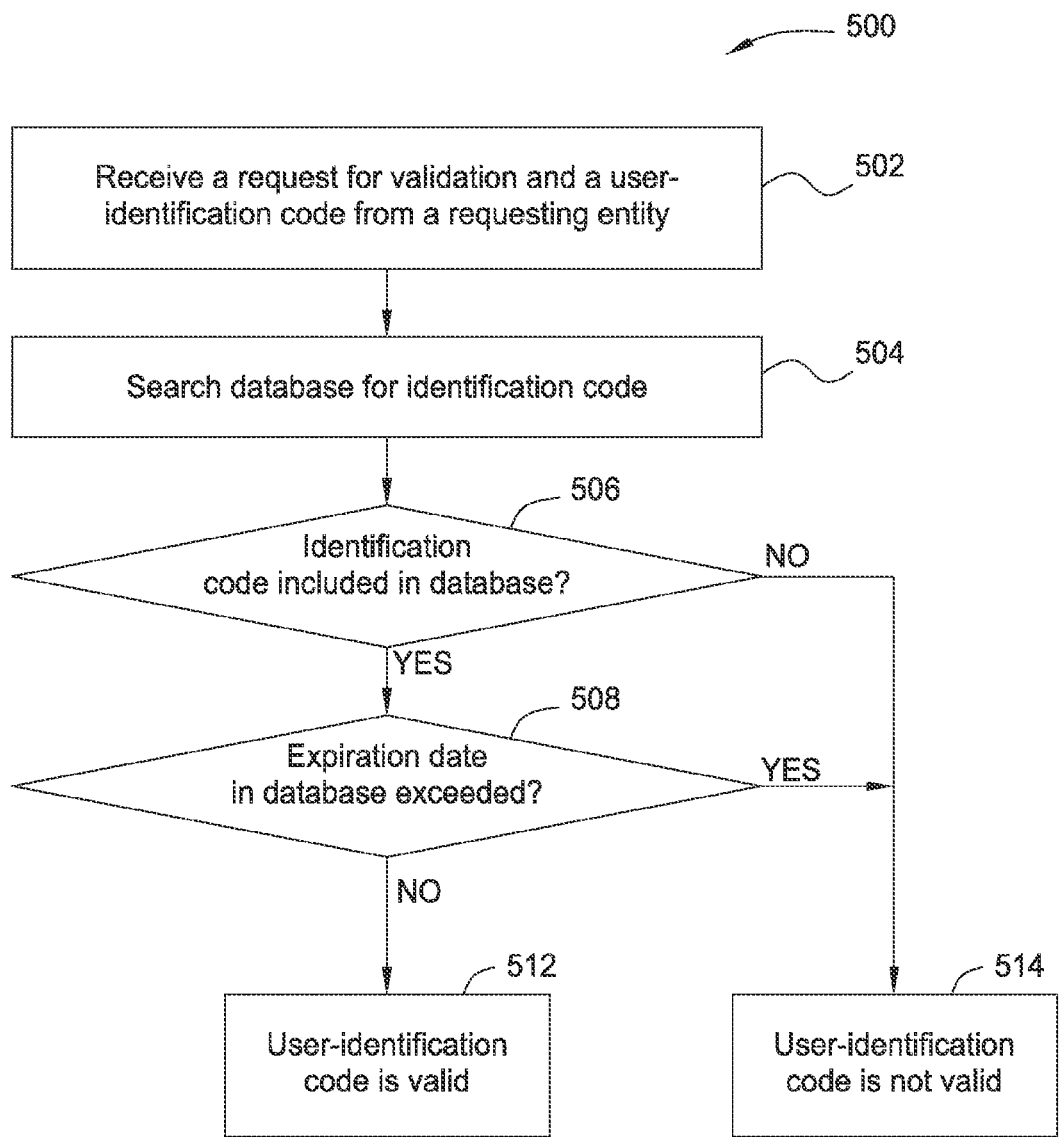
FIG. 5 is a flow diagram of method steps for validating a user-identification code, according to one embodiment of the present invention.

FIG. 5 is a flow diagram of method steps for validating a user-identification code, according to one embodiment of the present invention. Although the method steps are described in conjunction with the systems of FIGS. 1-3, persons skilled in the art will understand that any system configured to perform the method steps, in any order, falls within the scope of the present invention.

As shown, a method 500 begins at step 502, where the authentication server 112 receives a request for validation and a user-identification code from a requesting entity (e.g., from kitchen management system 104). This request may be received as the result of a customer scanning the user-identification code (as a QR code) at a scanner 108 coupled to kitchen management system 104. In step 504, the authentication server 112 searches a database for the user-identification code received from the requesting entity. In step 506, if the authentication server 112 determines that the database includes the identification code, then the method proceeds to step 508. If the authentication server 112 determines that the database does not include the identification code, then the method proceeds to step 514.

In step 508, the authentication server 112 determines whether the expiration date stored in the database is exceeded. In other words, the authentication server 112 determines whether the current time is later than the expiration date associated with the user-identification code. If the expiration date is exceeded, then the method proceeds to step 514. If the expiration date is not exceeded, then the method proceeds to step 512.

In step 512, the authentication server 112 determines that the user-identification code is valid. In this case, the authentication server 112 checks-in the user-identification code, indicating that the customer associated with the user-identification code is present in a particular store 102. In step 514, the authentication server 112 determines that the user-identification code is not valid and thus does not check-in the user-identification code. The authentication server 112 has determined that the customer associated with the user-identification code has scanned a forged user-identification code and therefore should not be granted customer benefits.

Persons skilled in the art will recognize that computing device represents just one exemplary implementation of a component within the system of FIG. 1, and that other implementations also fall within the scope of the present invention. As a general matter, computing device may be any technically feasible type of device configured to implement any of the functionality described here.

In sum, a customer mobile device requests a user-identification code from an authentication server so that a customer may check into a store to receive customer benefits. The authentication server provides a user-identification to the customer mobile device in response. When the customer enters the store, the customer opens an app to display the user-identification code and scans the user-identification code at a scanner coupled to a kitchen management system to check in to the store. The kitchen management system transmits the scanned user-identification code to the authentication server for verification.

The authentication server checks a database to determine whether the user-identification code is stored in the database. If the user-identification code is stored in the database, then the authentication server checks whether an expiration date for the user-identification code has passed. If the expiration date has not passed, then the authentication checks whether the user-identification code is checked-in at a different store. If the expiration date has not passed and the user is not checked-in at a different store, then the authentication server checks the user in at the store. Subsequently, when the user arrives at a purchase counter, store staff may obtain a list of checked-in customers from a point-of-sale system that includes the customer associated with the checked-in user-identification code.

One advantage of the disclosed approach is that by frequently updating the user-identification code associated with a particular customer, the ability to present duplicate user-identification codes to obtain customer benefits is greatly hindered. This hindrance allows businesses to grant customer benefits to desired customers with a reduced risk from impostors. Another advantage is that a customer may keep such a secure code mechanism on a device that the customer normally carries around, such as a smart phone.

Thus, the ability to securely receive customer benefits does not incur a burden associated with carrying additional papers, cards, or the like.

It will be appreciated that the system shown herein is illustrative and that variations and modifications are possible. Connections between the various components of the system of FIG. 1 may be modified as desired. Further, some of the particular components shown may be optional.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for securely managing user-specific benefits, the method comprising:
    generating, via a processor, a user-identification code based on a request transmitted from a computing device;
    generating an expiration date associated with the user-identification code;
    transmitting the user-identification code and the expiration date back to the computing device; and
    determining whether the user-identification code subsequently received from a code scanning system is valid.

2. The computer-implemented method of claim 1, further comprising:
    determining that the expiration date associated with the user-identification code received from the code scanning system has passed; and
    in response, indicating that the user-identification code is invalid.

3. The computer-implemented method of claim 1, further comprising:
    determining that the user-identification code is currently registered at a second location that is different from a location where the code scanning system resides; and
    in response, indicating that the user-identification code is invalid.

4. The computer-implemented method of claim 1, further comprising:
    determining that the expiration date associated with the user-identification code has not passed and that the user-identification code is not registered at a second location that is different from a first location that is associated with the code scanning system; and
    in response, indicating that the user-identification code is valid.

5. The computer-implemented method of claim 4, further comprising storing an indication that the user-identification code is registered at the first location in response to determining that the user-identification code is valid.

6. The computer-implemented method of claim 5, further comprising storing a second expiration date associated with the indication that the user-identification code is registered at the first location.

7. The computer-implemented method of claim 1, further comprising:
    receiving a request for a list of users that are registered at a first location where the code scanning system resides; and
    in response, generating the list of users that are registered.

8. The computer-implemented method of claim 7, further comprising storing user-identification information associated with the user-identification code.

9. The computer-implemented method of claim 8, wherein at least a portion of the list of users is based on the user-identification information and the user-identification code.

10. The computer-implemented method of claim 1, further comprising validating secondary user-identification information upon validating the user-identification code.

11. The computer-implemented method of claim 10, wherein the secondary user-identification information comprises at least one of a media access control address, facial recognition information, and personal appearance information.

12. The computer-implemented method of claim 10, wherein validating the secondary user-identification information comprises validating alternative secondary user-identification information that is associated with a user that does not own the computing device.

* * * * *

UNITED STATES PATENT AND TRADEMARK OFFICE
CERTIFICATE OF CORRECTION

PATENT NO.         : 9,514,347 B2
APPLICATION NO.    : 14/942999
DATED              : December 6, 2016
INVENTOR(S)        : Jonathan Kaplan, Jay Amando Domingo Llacuna and Stanley Peter Demarta It is certified that error appears in the above-identified patent and that said Letters Patent is hereby corrected as shown below:

On the Title Page

(71) Applicant:

Please delete "Fish Six RC" and insert --Fish Six RC dba THE MELT--;

(73) Assignee:

Please delete "FISH SIX RC" and insert --FISH SIX RC DBA THE MELT--.

Signed and Sealed this
Twenty-fifth Day of April, 2017

Michelle K. Lee
*Director of the United States Patent and Trademark Office*